United States Patent [19]
Umemura et al.

[11] Patent Number: 5,842,923
[45] Date of Patent: Dec. 1, 1998

[54] SCREW AND METHOD FOR ITS PRODUCTION

[75] Inventors: Masaharu Umemura; Takashi Yamamoto, both of Fujisawa; Ryoichi Nakayama, Yokohama, all of Japan

[73] Assignees: Minebea Kabushiki-Kaisha, Nagano-ken; Nissan Jidosha Kabushiki-Kaisha, Kanagawa-ken, both of Japan

[21] Appl. No.: 978,276

[22] Filed: Nov. 28, 1997

Related U.S. Application Data

[63] Continuation of Ser. No. 647,811, May 15, 1996, abandoned.

[30]    Foreign Application Priority Data

Jun. 14, 1995  [JP]  Japan ................................. 7-171435

[51] Int. Cl.⁶ .............................................. B21H 3/02
[52] U.S. Cl. ................................................. 470/10
[58] Field of Search ............................ 72/102, 103, 104, 72/88, 90; 470/8, 9, 10, 57, 58, 66, 70, 71

[56]         References Cited

U.S. PATENT DOCUMENTS

| | | | |
|---|---|---|---|
| 2,197,732 | 4/1940 | Olson ........................................ | 470/10 |
| 2,278,411 | 4/1942 | Braendel .................................... | 470/9 |
| 3,180,202 | 4/1965 | Kahn . | |
| 3,195,156 | 7/1965 | Phipard, Jr. .............................. | 411/416 |
| 3,209,383 | 10/1965 | Carlson .................................... | 411/416 |
| 3,479,921 | 11/1969 | Omoto . | |
| 3,530,760 | 9/1970 | Lindstrand .............................. | 411/416 |
| 3,633,455 | 1/1972 | Larson ....................................... | 470/9 |
| 3,772,720 | 11/1973 | Yamamoto ............................... | 411/416 |
| 3,878,759 | 4/1975 | Carlson ....................................... | 470/9 |
| 3,935,785 | 2/1976 | Lathom .................................... | 411/416 |
| 4,546,639 | 10/1985 | Corrette ..................................... | 72/88 |
| 4,561,277 | 12/1985 | Taubert et al. ............................. | 72/88 |
| 4,724,694 | 2/1988 | Medal ........................................ | 72/88 |
| 5,044,855 | 9/1991 | Fukubayashi ........................... | 411/416 |
| 5,243,843 | 9/1993 | Dickson .................................... | 72/88 |
| 5,483,810 | 1/1996 | Stencel ...................................... | 72/88 |

FOREIGN PATENT DOCUMENTS

| | | | |
|---|---|---|---|
| 45-30853 | 10/1970 | Japan . | |
| 62-33035 | 2/1987 | Japan ....................................... | 72/88 |

OTHER PUBLICATIONS

Brochure: Form and Tight TF–BOLT FT–SCREW, by Minebea Co., Ltd Tokyo Screw Div., Tokyo, Japan, printed in Japan.

*Primary Examiner*—Joseph J. Hail, III
*Assistant Examiner*—Ed Tolan
*Attorney, Agent, or Firm*—Frishauf, Holtz, Goodman, Langer & Chick

[57]         ABSTRACT

The screw comprises a circular thread portion 2a formed in a base portion of the screw, in which a helical thread is formed at the same depth and at the same crest angle; a special non-circular thread portion 2b which follows the portion 2a and has its thread depth gradually vary so as to assume a polygonal shape in cross section and permit the crest portion of thread to reach its highest points A–J in a turn of the thread, the highest points A–J being equal in thread depth and crest angle to the thread of the portion 2a; the portion 2b has its crest angle gradually increase as the thread moves from the highest points A–J to its lowest points along the length of the thread; and, lines connecting axially adjacent ones of the highest points A–J are tilted from the axis of the screw at a predetermined angle so that the portion 2b assumes a twisted polygonal prism-like shape as a whole.

8 Claims, 9 Drawing Sheets

- article being fastened
- non-cirular screw
- crest portion of screw
- root portion of screw

- 21
- 22
- 20

- article being fastened
- circular screw
- crest portion of screw
- root portion of screw

- 23
- 24

SCREW AND METHOD FOR ITS PRODUCTION

This application is a Division of application Ser. No. 08/647,811, filed May 15, 1996 now abandoned.

BACKGROUND OF THE INVENTION

1. Field of the Invention

The present invention relates to a screw and a method for its production, the screw being provided with a special non-circular thread portion in which the crest portions of thread vary in diameter.

2. Description of the Prior Art

Screws comprise, in a wide sense, bolts and the like. In such screws, there are many types of non-standard or non-circular screws in addition to the standard screws such as the metric, the unified and like standard screws. In any of the standard screws, the crest portions and the root portions of the screw substantially do not vary in diameter throughout the length of the screw. On the other hand, a certain type of the non-circular screw has its crest portion of thread vary in thread height or depth along the length of the thread in a manner such that the screw has a polygonal contour in cross section, i.e., such that the crest portion of thread reaches a plurality of its highest points when the thread makes a turn on the axis of the screw.

The standard screw substantially does not vary in diameter of its crest portions and also does not vary in its crest angle throughout the length of the screw, whereas the non-circular screw varies in diameter of its crest portions and also varies in its crest angle.

The non-circular screws have been widely used as self-tapping screws applied to non-threaded holes, burring holes and like holes or drilled bores. However, since the non-circular screw is larger in diameter of its crest portion than any of the metric and the unified standard screws, it suffers from large initial torque which is required to drive the screw into the hole. Consequently, in case that torque checking operation is automatically conducted, some non-circular screws often are not sufficiently driven or screwed into the holes.

Further, as shown in FIG. 16, in contrast with any of the standard screws such as the metric and the unified standard screws, the non-circular screw varies in diameter of its crest portions and in its crest angle so that a radial gap 22 is produced between a root portion 20 of a corresponding female screw and a crest portion 21 of the non-circular screw. Due to the presence of such radial gap 22, the non-circular screw is smaller in size of threadable engagement area with the female screw than a standard screw 23 of the metric, the unified or other standard screw thread systems, the standard screw 23 being closely engaged with a female screw 24 as is clear from FIG. 17. Consequently, due to such smaller size in threadable engagement area, the non-circular screw is also inferior to the standard screw in axial yield strength and in the amount of torque required to break the screw in fastening operation, and, is therefore partially restricted in its field of application. This is a disadvantage inherent in the non-circular screw.

SUMMARY OF THE INVENTION

It is an object of the present invention to provide a screw and a method of its production, which screw is used as a self-tapping screw, capable of being driven with small initial torque, free from the problems inherent in the conventional screws, sufficiently large in fastening strength and in the amount of torque required to break the screw in fastening operation, and is therefore widely used in various industrial fields.

According to a first aspect of the present invention, the above object of the present invention is accomplished by providing A screw comprising:

a circular thread portion formed in a base portion of the screw, in which circular thread portion a helical thread is formed at the same depth and at the same crest angle; and a special non-circular thread portion formed in a front-end portion of the screw following the base portion, the special non-circular thread portion of the screw having its thread depth gradually vary in a manner such that the special non-circular thread portion assumes a substantially polygonal shape in cross section so as to permit the crest portion of thread to reach a plurality of its highest points in a turn of the thread, the highest points of the non-circular thread portion being substantially equal in thread depth and in crest angle to the thread of the circular thread portion.

According to a second aspect of the present invention, the above object of the present invention is accomplished by providing The screw as set forth in the first aspect of the present invention, wherein:

the special non-circular thread portion has its crest angle gradually increase as the thread moves from each of the highest points to each of its lowest points along the length of the thread; and each of a plurality of lines connecting axially adjacent ones of the highest points of the crest portion of thread in the non-circular thread portion of the screw is tilted from a longitudinal axis of the screw at a predetermined angle in a manner such that the non-circular thread portion assumes a twisted polygonal prism-like shape as a whole.

According to a third aspect of the present invention, the above object of the present invention is accomplished by providing The screw as set forth in the first or the second aspect of the present invention, wherein:

the special non-circular thread portion is provided with a converging special non-circular taper thread portion in its front-end portion.

According to a fourth aspect of the present invention, the above object of the present invention is accomplished by providing The screw as set forth in the third aspect of the present invention, wherein:

the special non-circular thread portion has both the diameter of its root portion of thread and the height or depth of its crest portion of thread gradually decrease toward its front end; and the special non-circular taper thread portion is so formed as to reach a front end of the screw.

According to a fifth aspect of the present invention, the above object of the present invention is accomplished by providing A method for producing a screw, characterized in that:

the screw with a helical thread is produced by rolling a stepped-stock blank with the use of flat thread rolling dies;

each of the flat thread rolling dies comprises a plurality of first rolling grooves with a predetermined depth for forming a circular thread portion of the screw and a plurality of second rolling grooves gradually varying in depth for forming a special non-circular thread portion of the screw, the second rolling grooves following the first rolling grooves, both the first and second rolling grooves extending parallel to each other at a predetermined lead angle to cover the entire surface of the die; and the blank of the screw comprises a first portion being rolled into the circular thread portion of the screw and a second portion being rolled into the special non-circular thread portion of the screw, the second portion being smaller in cross section than the first portion.

According to a sixth aspect of the present invention, the above object of the present invention is accomplished by providing The method for producing the screw, as set forth in the fifth aspect of the present invention, wherein:

the blank of the screw has the second portion be smaller in cross section than the first portion by the amount of from 1.0 to 8.0 per cent of a cross sectional area of the first portion; and a transition portion for smoothly connecting the second portion to the first portion of the blank is formed therebetween in the blank.

Further, according to a seventh aspect of the present invention, the above object of the present invention is accomplished by providing The method for producing the screw, as set forth in the fifth or the sixth aspect of the present invention, wherein:

the blank of the screw has its front-end portion converged and formed into a front-end taper portion which decreases in diameter toward its front end; and a thread rolling die for rolling the blank of the screw is provided with an inclination portion which has its crest portions of thread gradually increase in thread height or depth so as to correspond to the front-end taper portion of the blank being rolled.

DESCRIPTION OF THE PREFERRED EMBODIMENTS

Hereinbelow, the present invention will be described in detail with reference to embodiments shown in the accompanying drawings, particularly in FIGS. 1 to 10.

Figure 1:
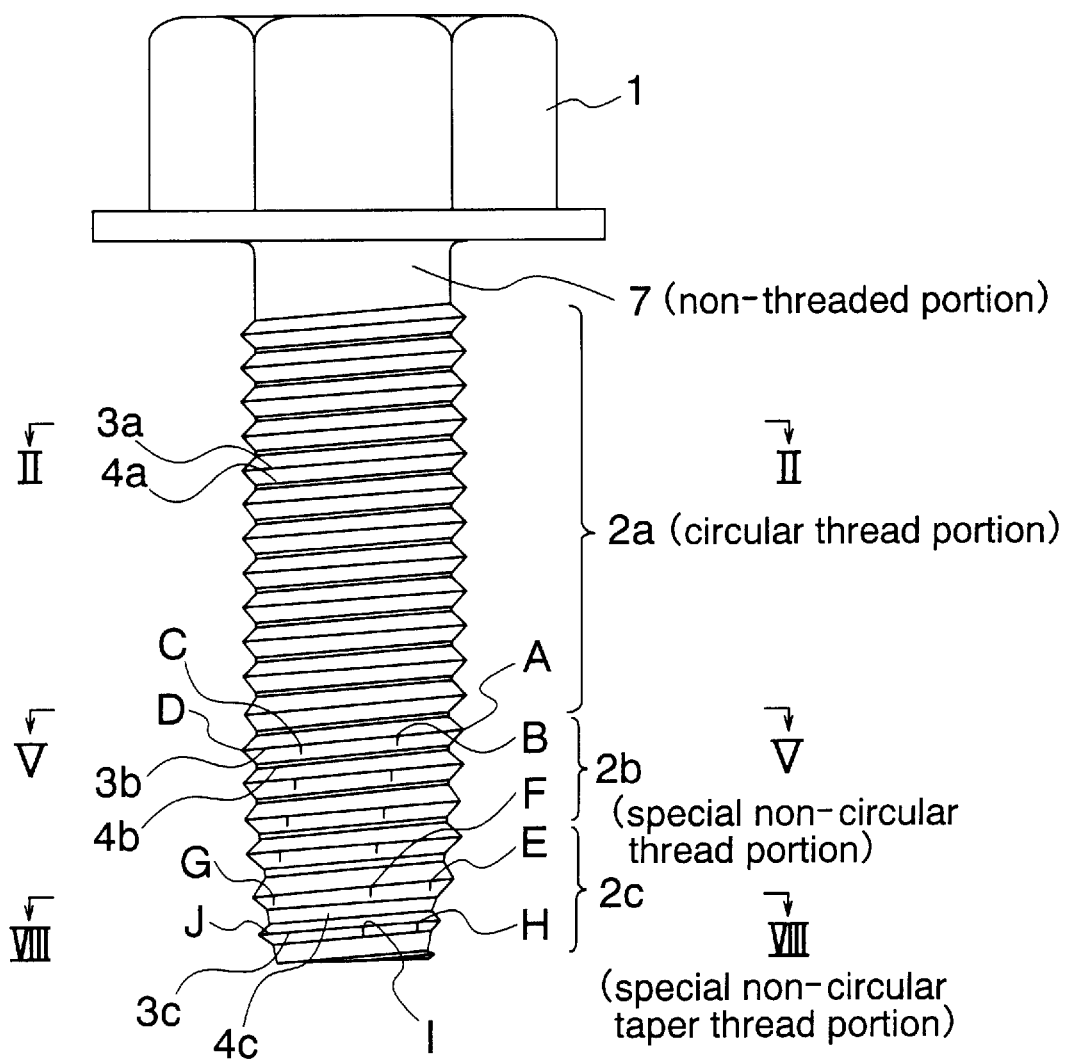
FIG. 1 is a front view of an embodiment of a screw of the present invention.
Figure 2:
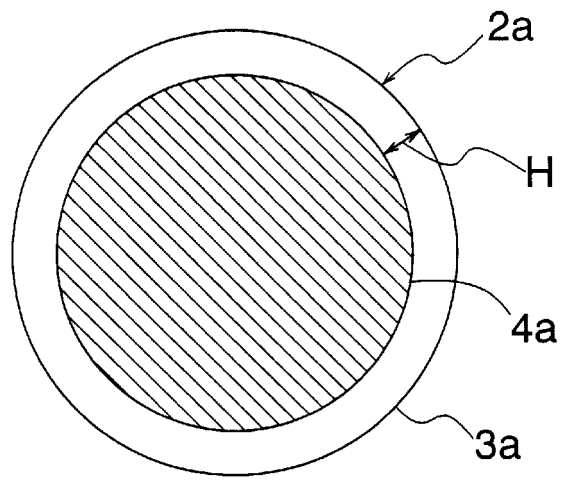
FIG. 2 is a cross-sectional view of a circular thread portion of the screw of the present invention, taken along the line II—II of FIG. 1.

As shown in FIG. 1, an embodiment of a screw of the present invention comprises: a head portion 1 followed by a non-threaded portion 7; a normal circular thread portion 2a following the non-threaded portion 7; a special non-circular thread portion 2b following the circular thread portion 2a; and a special non-circular taper thread front-end portion 2c following the non-circular thread portion 2b.

Figure 3:
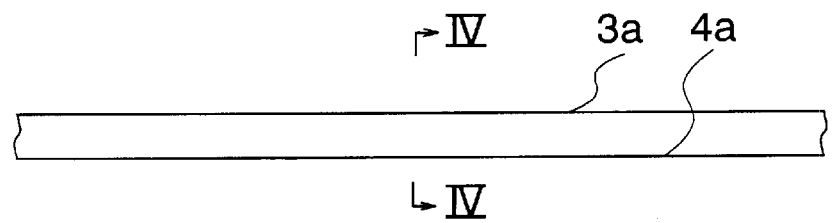
FIG. 3 is similar to FIG. 2 but illustrating a fraction of thread in the circular thread portion, having been straightened and developed on a plane.
Figure 4:
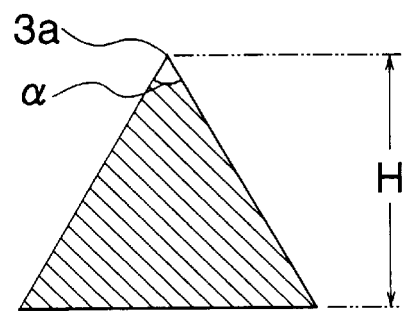
FIG. 4 is an enlarged cross-sectional view of the fraction of thread, taken along the line IV—IV of FIG. 3.

Of these portions, the circular thread portion 2a is of, for example, the metric coarse thread series, and, therefore does not vary in diameter of both the crest portions 3a and the root portions 4a throughout the entire axial length of the circular thread portion 2a, as is clear from FIGS. 3 and 4. It is also clear from FIG. 2 that the circular thread portion 2a assumes a circular shape in cross-section and its crest angle does not vary throughout the axial length of the circular thread portion 2a.

On the other hand, in the special non-circular thread portion 2b, the root portions 4b are equal in diameter to those of the circular thread portion 2a throughout the entire axial length of the non-circular thread portion 2b. In contrast with these root portions 4b, crest portions 3b of the non-circular thread portion 2b vary in diameter throughout the entire length of the thread.

Figure 5:
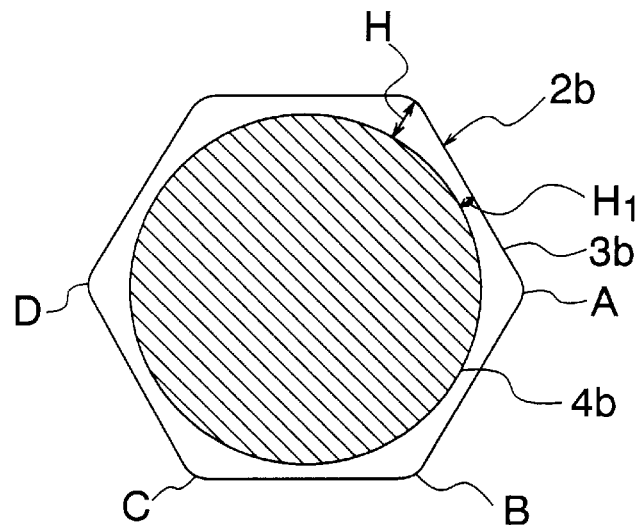
FIG. 5 is a cross-sectional view of a special non-circular thread portion of the screw of the present invention, taken along the line V—V of FIG. 1.
Figure 6:
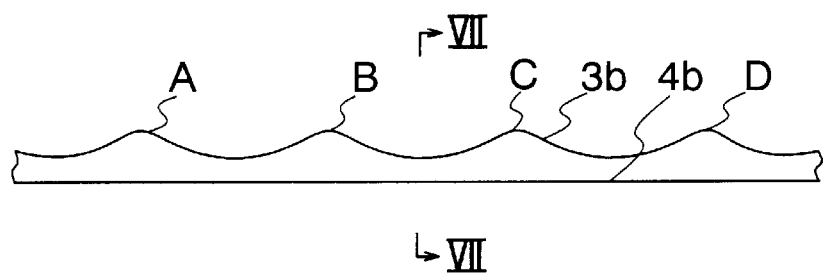
FIG. 6 is similar to FIG. 3 but illustrating a fraction of thread in the special non-circular thread portion of the screw of the present invention, the fraction having been straightened and developed on a plane.
Figure 7:
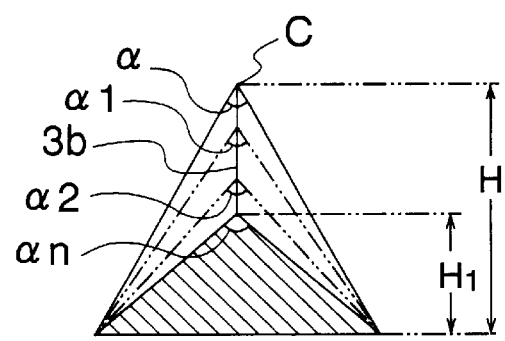
FIG. 7 is an enlarged cross-sectional view of the fraction of thread, taken along the line VII—VII of FIG. 6.

In other words, as shown in FIG. 5, the crest portion 3b of the special non-circular thread portion 2b in one turn of the thread substantially assumes a regular polygonal shape with rounded corners which form a plurality of the highest points A, B, C, D, . . . of the crest portion 3b. Each of these highest point A, B, C, D, . . . has the same height H and the same crest angle "α" as those of the crest portions 3a of the circular thread portion 2a. When the number of these highest points A, B, C, D, . . . is six, the crest portion 3b of the special non-circular thread portion 2b in one turn of the thread substantially assumes a regular hexagonal shape.

In the crest portion 3b of such special non-circular thread portion 2b, a height H1 of the crest portion 3b between adjacent ones of the highest points A, B, C, D, . . . is smaller than the height H of the highest point. The height H1 of the crest portion 3b gradually decreases to reach its lowest point at a center of a side of the regular hexagonal shape of the thread, as is clear from FIGS. 5 and 6. On the other hand, the crest angle ($\alpha 1$, $\alpha 2$, $\alpha 3$, . . . , $\alpha n$) of the crest portion 3b between adjacent ones of the highest points A, B, C, D, . . . gradually increases toward the lowest point of the crest portion 3b in a manner such that: the crest angle "$\alpha$" at the highest point of the crest portion 3b is smaller than $\alpha 1$; $\alpha 1$ is smaller than $\alpha 2$; $\alpha 2$ is smaller than $\alpha 3$; . . . ; $\alpha n-1$ is smaller than $\alpha n$.

In other words, the crest angle in the crest portion 3b is defined so that the "$\alpha$" is smaller than $\alpha i$ (i=1, 2, 3, . . . , n−1, n). In some cases, $\alpha 1$ and $\alpha 2$ may be equal to the "$\alpha$" or $\alpha n$.

On the other hand, in the special non-circular taper thread portion 2c, the crest portions 3c gradually decrease in diameter toward a front end of the screw to have a convergent contour. Further, the root portions 4c of the taper thread portion 2c also gradually decrease in diameter toward the front end of the screw to have a convergent contour as is in the crest portions 3c.

Figure 8:
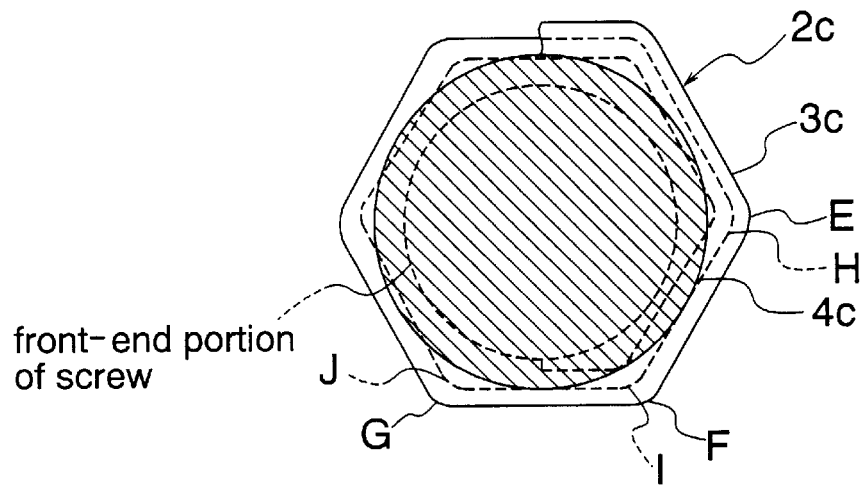
FIG. 8 is a cross-sectional view of a special non-circular taper thread portion of the screw of the present invention, taken along the line VIII—VIII of FIG. 1.
Figure 9:
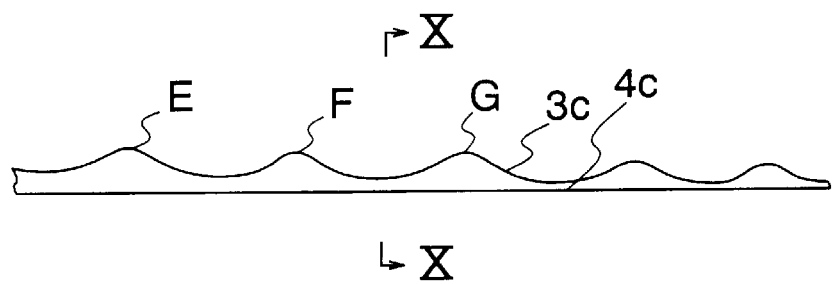
FIG. 9 is similar to FIG. 6 but illustrating a fraction of thread in the special non-circular taper thread portion of the screw of the present invention, the fraction having been straightened and developed on a plane.
Figure 10:
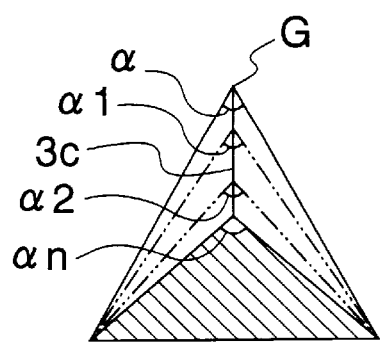
FIG. 10 is an enlarged cross-sectional view of the fraction of thread, taken along the line X—X of FIG. 9.

As shown in FIGS. 8 and 9, the crest portion 3c of this special non-circular taper thread portion 2c has a plurality of the highest points E, F, G, . . . in one turn of the thread as is in the case of the crest portion 3b of the special non-circular thread portion 2b described above. In addition, the crest angle "$\alpha$" of any of the highest points E, F, G, . . . is the same as that of any of the highest points A, B, C, D, . . . , of the crest portion 3b of the special non-circular thread portion 2c. A difference between the crest portions 3b and 3c is that the highest points E, F, G, . . . of the crest portion 3c gradually decrease in height toward the front end of the thread, whereas the highest points A, B, C, D, . . . of the crest portion 3b do not vary in height throughout the entire length of the thread.

Figure 18:
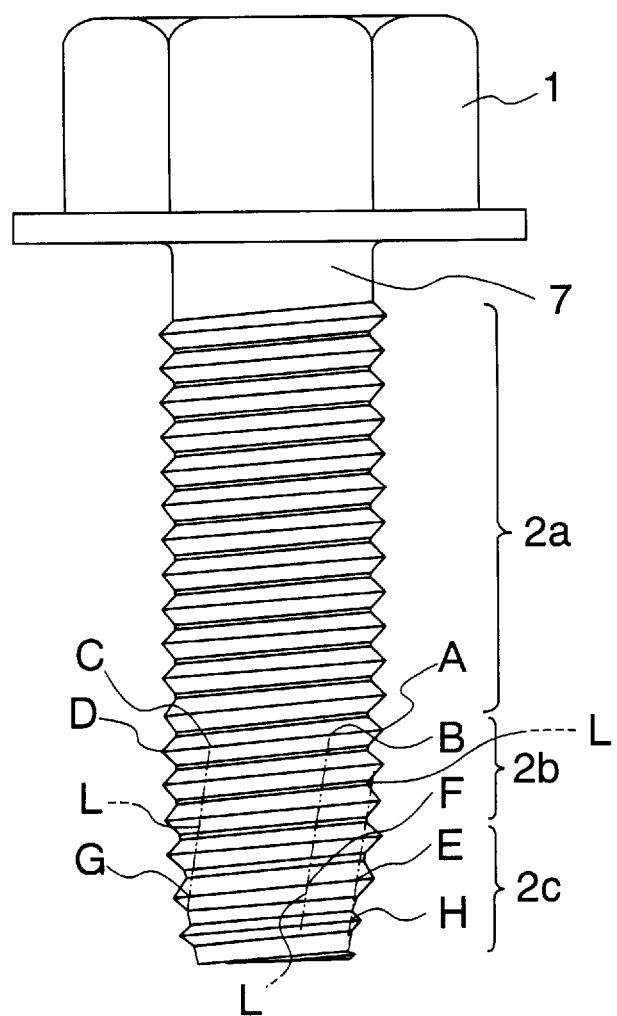
FIG. 18 is a front view of the embodiment of a screw of the present invention as shown in FIG. 1, including line L which more clearly shows radial offsets of maximum points of the non-circular threaded portion and the non-circular taper threaded portion.

In each of the special non-circular thread portion 2b and the taper thread portion 2c, a line (L) passing through the axially adjacent ones of the highest points is tilted at an angle of about 10 to about 15 degrees from a longitudinal axis of the screw (FIG 18). In other words, each of the special non-circular thread portion 2b and the taper thread portion 2c has a 10–15 deg., right- or left-hand helix in the highest points of its crest portions, and, therefore assumes a substantially twisted polygonal prism-like shape, provided that the twisted shape of the latter 2c is tapered.

Further, formed in each of the highest points of the special non-circular thread portion 2b and its taper thread portion 2c is a tapping edge.

Incidentally, in the screw of the embodiment of the present invention described above, the thread keeps its pitch constant throughout the entire length of the screw comprising the circular thread portion 2a, special non-circular thread portion 2b and its taper thread portion 2c.

Now, a method of the present invention for producing the above screw of the present invention will be described with reference to FIGS. 11 to 15.

Figure 11:
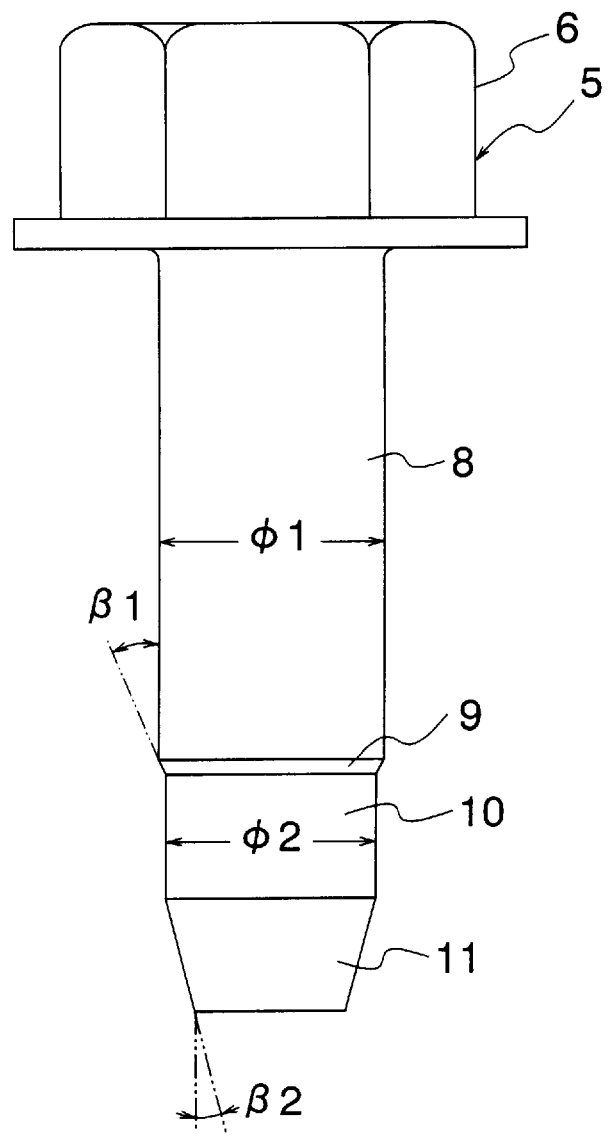
FIG. 11 is a front view of a blank (i.e., round stock) of the screw of the present invention.

A blank (i.e., round stock) 5 to be formed into the screw of the present invention by rolling operation is shown in FIG. 11. The blank 5 comprises: a head portion 6; a large-diameter portion 8 following the head portion 6, in which large-diameter portion 8 a circular thread portion 2a is formed by rolling; a small-diameter portion 10 following the large-diameter portion 8, in which small-diameter portion 10 a special non-circular thread portion 2b is formed by rolling; and, a front-end converging taper portion 11 following the small-diameter portion 10, in which taper portion 11 a special non-circular taper thread portion 2c is formed by rolling. Formed between the large-diameter portion 8 and the small-diameter portion 10 is a converging transition portion 9.

In diameter: the large-diameter portion 8 is smaller than the crest portion of the circular thread portion 2a and larger than the root portion of the same 2a; and, the small-diameter portion 10 is smaller than the crest portion of the special non-circular thread portion 2b and larger than the root portion of the same 2b. Both the diameters of the large-diameter portion 8 and the small-diameter portion 10 are determined in a manner such that the small-diameter portion 10 is smaller in cross-sectional area than the large-diameter portion 10 by the amount of from 1.0 to 8.0 per cent of the cross-sectional area of the large-diameter portion 8.

A reduction ratio in cross-sectional area of the small-diameter portion 10 as to the large-diameter portion 8 depends on both the nominal diameter and the pitch of the screw to be rolled.

The reason why the special non-circular thread portion 2b is rolled in the small-diameter portion 10 of the screw is that the average height of the crest portions of the special non-circular thread portion 2b thus rolled is lower than the height of the crest portion of the circular thread portion 2a. In other words, when both the special non-circular thread portion 2b and the circular thread portion 2a are rolled in the same straight blank, the root portion of the non-circular thread portion 2b becomes larger in diameter than that of the circular thread portion 2a, which impairs the thus rolled screw in accuracy.

As for the diameters of the large-diameter portion 8 and the small-diameter portion 10 of the screw, for example, in case that an M8 male screw (i.e., with an outer diameter of 8 mm) is produced by rolling, a blank to be used comprises a large-diameter portion having a diameter "$\phi 1$" of 7.10 mm, and a small-diameter portion having a diameter "$\phi 2$" of 6.96 mm. On the other hand, in case that an M6 male screw (i.e., with an outer diameter of 6 mm) is produced by rolling, a blank 5 to be used comprises a large-diameter portion having a diameter "$\phi 1$" of 5.27 mm, and a small-diameter portion having a diameter "$\phi 2$" of 5.13 mm.

Incidentally, it is preferable that the converging transition portion 9 of the blank 5 has an inclination angle "$\beta 1$" of approximately 15 degrees, and a taper portion 11 of the blank 5 has an inclination angle "$\beta 2$" of approximately 13 degrees.

The blank 5 is formed into the screw of the present invention by rolling with the use of flat thread rolling dies 12 one of which is shown in FIGS. 12 to 15.

Figure 12:
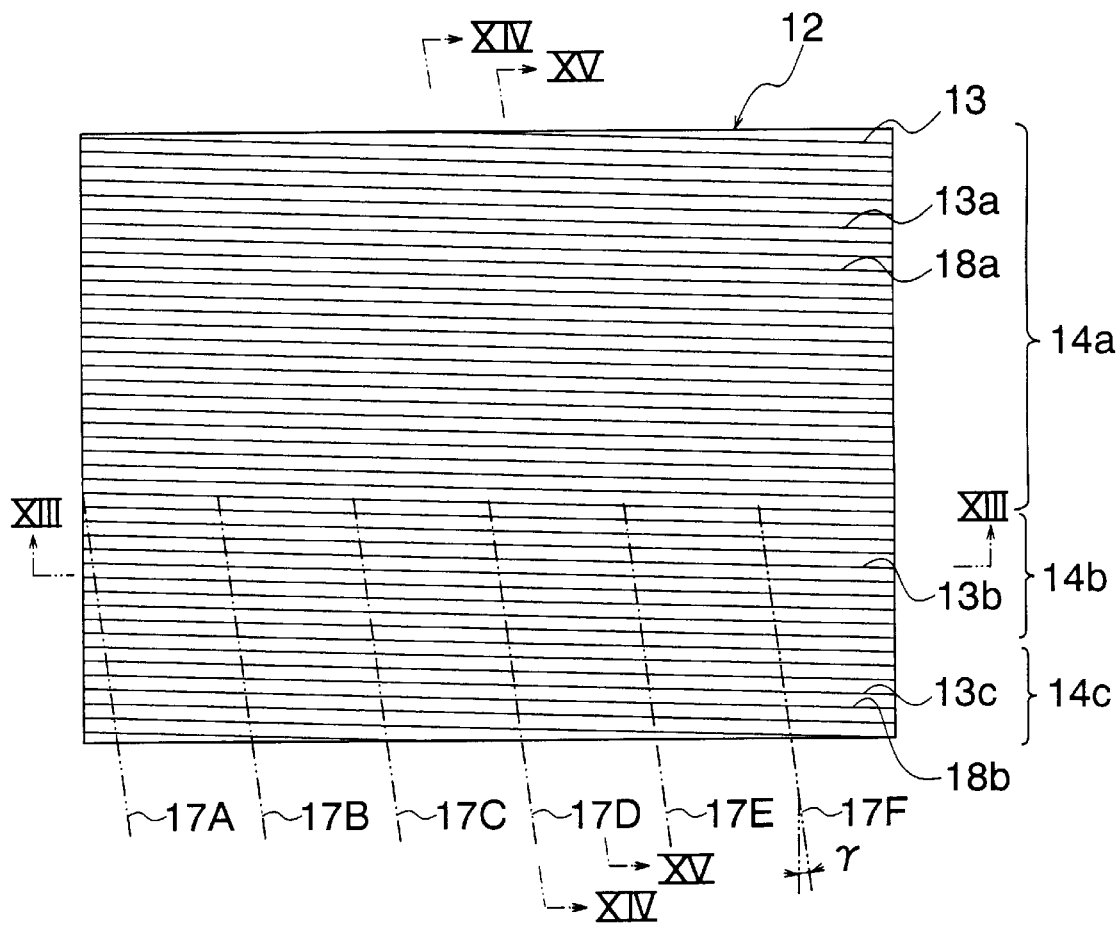
FIG. 12 is a front view of an example of one of flat thread rolling dies used in thread rolling for producing the screws of the present invention.

As shown in FIG. 12, the flat thread rolling die 12 is provided with a rectangular rolling surface a width of which is slightly larger in length than one turn of the thread being produced. Formed in this rolling surface of the die 12 are a plurality of rolling grooves 13 for forming the thread in the blank 5. The rolling grooves 13 are straight and parallel to each other to cover the entire area of the rolling surface of the die 12. An inclination angle of the rolling groove 13 is equal in amounts to a lead angle of the screw being rolled.

The rolling surface of the die 12 is constructed of: a circular thread rolling portion 14a for rolling the thread in the large-diameter portion 8 of the blank 5; a special non-circular thread rolling portion 14b for rolling the thread in the small-diameter portion 10 of the blank 5; and, a special non-circular taper thread rolling portion 14c for rolling the thread in the taper portion 11 of the blank 5. In both the circular thread rolling portion 14a and the special non-circular thread rolling portion 14b, crest portions 18a each of which is disposed between adjacent ones of the rolling grooves 13 have the same height to lie in the same plane. In contrast with this, in the special non-circular taper thread rolling portion 14c, crest portions 18b each of which is disposed between adjacent ones of the rolling grooves 13 gradually increase in height toward a lower-end portion of the rolling surface of the die 12 so as to correspond in contour to an inclination of the taper portion 11 of the blank 5.

Entirely formed in the circular thread rolling portion 14a are a plurality of rolling grooves 13a each of which has its depth and its root angle be equal in amounts to the height H and the crest angle "α" of the crest portion of the circular thread portion 2a of the screw, respectively.

Figure 13:
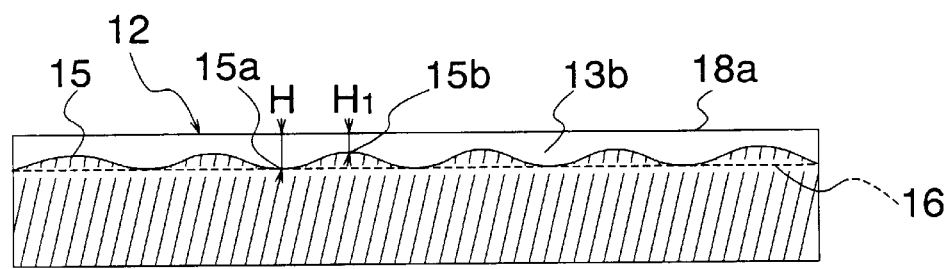
FIG. 13 is a cross-sectional view of the flat thread rolling die, taken along the line XIII—XIII of FIG. 12.
Figure 14:
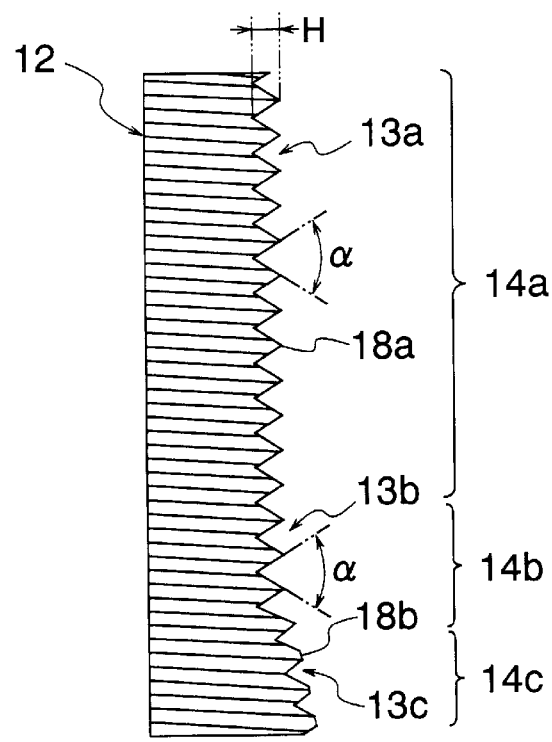
FIG. 14 is a cross-sectional view of the flat thread rolling die, taken along the line XIV—XIV of FIG. 12.
Figure 15:
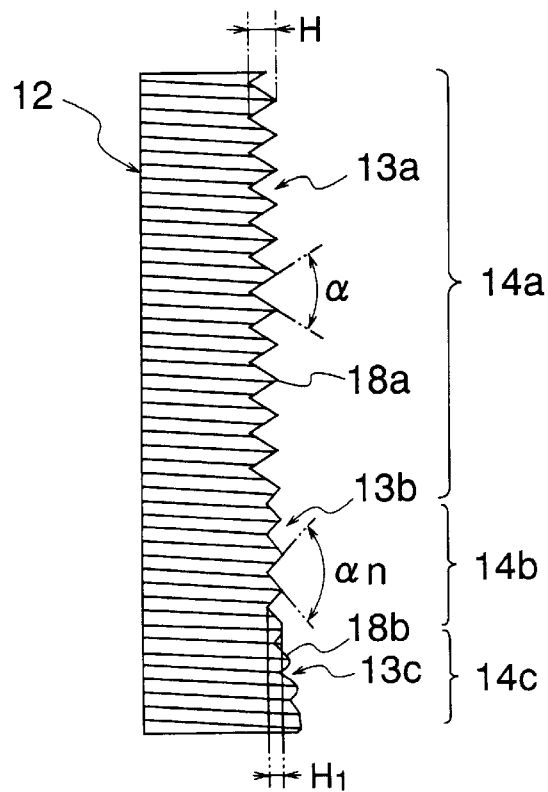
FIG. 15 is a cross-sectional view of the flat thread rolling die, taken along the line XV—XV of FIG. 12.
Figure 16:
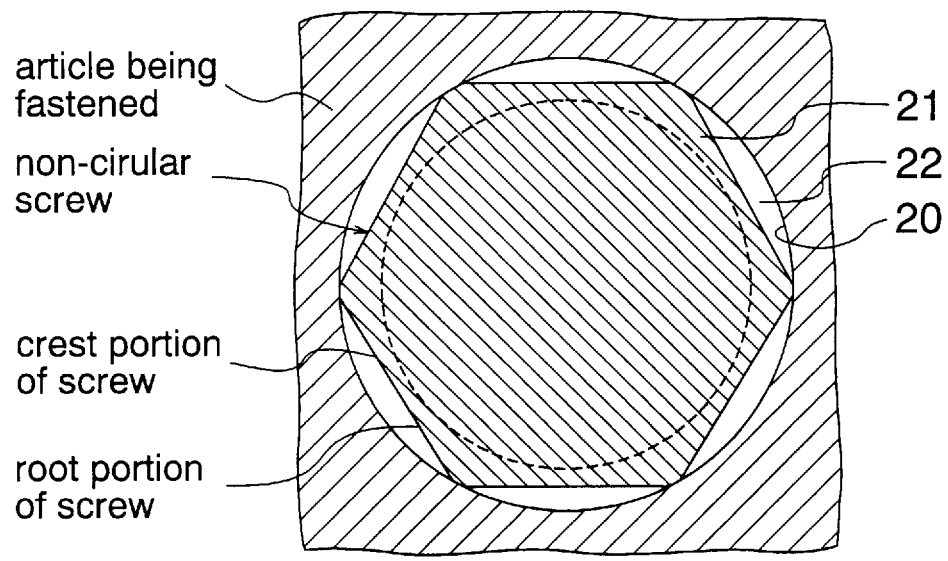
FIG. 16 is a cross-sectional view of the conventional non-circular screw engaged with its corresponding female screw, illustrating their threadable engagement.
Figure 17:
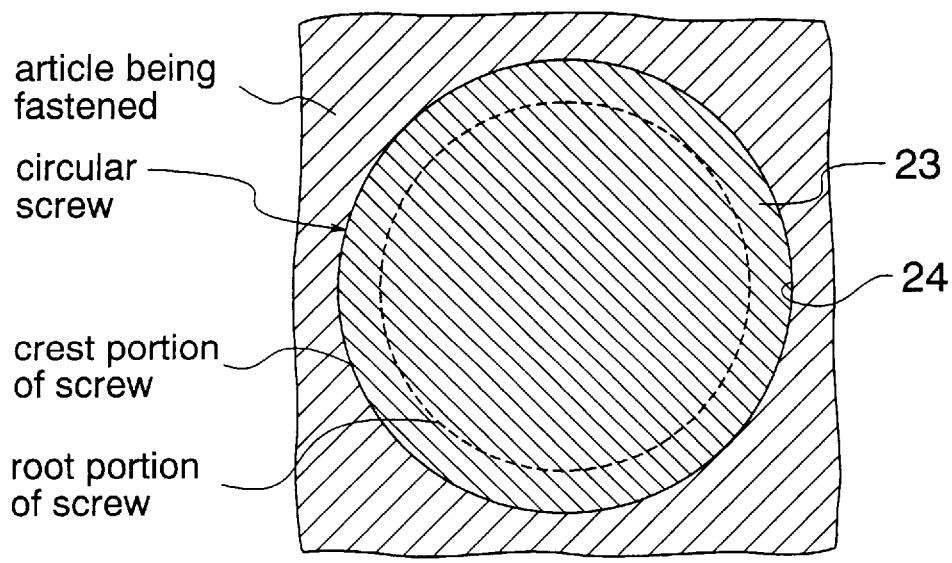
FIG. 17 is a cross-sectional view of the conventional circular screw engaged with its corresponding female screw, illustrating their threadable engagement.

Formed in the special non-circular thread rolling portion 14b are a plurality of rolling grooves 13b each of which has its depth gradually vary in a manner such that a root portion 15 of the rolling groove 13b has a wavy contour, as shown in FIG. 13. In the rolling groove 13b, a depth of one of its deepest points 15a is equal in amounts to the height H of the crest portion of the special non-circular thread portion 2b. A depth of the rolling groove 13b gradually decreases toward its shallowest point 15b. In thread formation, these deepest points 15a of the rolling groove 13b correspond to the highest points of the crest portion of the special non-circular thread portion 2b. Incidentally, in the drawings (i.e., FIGS. 12 and 13), the reference numeral 16 denotes a root portion of the rolling groove 13a in the circular thread rolling portion 14a of the die 12.

As shown in phantom lines 17A, 17B, 17C, 17D, 17D and 17F (i.e., 17A–17F) of FIG. 12, the deepest points of the rolling grooves are formed in a manner such that any of the phantom lines 17A–17F connecting the deepest points of adjacent ones of the rolling grooves forms an inclination angle "γ" with a vertical line perpendicular to opposite upper and lower sides of the die 12, as viewed in FIG. 12. Due to the presence of such inclination angle "γ", the special non-circular thread portion 2b of the screw assumes a substantially twisted polygonal prism-like shape.

In the rolling groove 13c of the special non-circular taper thread rolling portion 14c, a depth of the groove 13c gradually varies in a manner such that a root portion of the groove 13c assume a wavy shape as is in the rolling groove 13b of the special non-circular thread rolling portion 14b. A depth of the rolling groove 13c gradually decreases toward a lower side of the die 12a, which lower side corresponds to a front end of the screw being rolled.

By rolling the blank 5 with the use of the flat thread rolling dies 12, there is produced the screw of the present invention comprising: the circular thread portion 2a formed in an outer peripheral surface of the large-diameter portion 8 of the blank 5; the special non-circular thread portion 2b formed in the small-diameter portion 10 of the blank 5; and, the special non-circular taper thread portion 2c formed in the taper portion 11 of the blank 5.

In operation, when the screw of the present invention having the above construction is turned in a condition in which its front-end special non-circular taper thread portion 2c is inserted into a hole or burring hole of an article being fastened, the hole is tapped by the highest points of the crest portions of both the special non-circular taper thread portion 2c and the special non-circular thread portion 2b following the taper thread portion 2c. Further turns of the screw results in threadable engagement between the thus tapped hole of the article being fastened and the normal circular thread portion 2a of the screw. Due to such additional threadable engagement of the normal circular thread portion 2a of the screw with the tapped hole of the article being fastened, the screw of the present invention has a sufficiently large threadable engagement area with the tapped hole of the article, and, therefore increases torque required to break the screw in fastening operation and improves in strength a threadably fastened portion of the article.

According to the first aspect of the present invention as to the screw, as described above, since the special non-circular thread portion 2b of the screw assumes a substantially twisted polygonal prism-like shape (in which the highest points of the crest portions thereof are substantially equal in height and in crest angle to the crest portions of the circular thread portion 2a of the screw) and follows to the circular thread portion 2a, it is possible to reduce initial torque for driving the screw into the hole of the article being fastened, which facilitates tapping operation of the hole and makes it possible to realize an automatic torque checking operation of the screw.

Further, in the present invention as to the screw, since the highest points of the crest portion of the special non-circular thread portion 2b are equal in diameter to the crest portions of the circular thread 2a, it is possible for the special non-circular thread portion 2b to tap in the hole a female screw which is capable of threadably engaging with the circular thread portion 2a, which reduces torque required to drive the circular thread portion 2a into the thus tapped hole, and, therefore shortens a fastening time of the screw. Since the threadable engagement area of the circular thread portion 2a of the screw with the thus tapped hole is sufficiently large, torque required to break the screw in its fastening operation increases, and an area in the vicinity of the hole of the article fastened with the screw is improved in strength.

According to the second aspect of the present invention as to the screw, since the lines (which connect the highest points of axially adjacent ones of the crest portions of the thread, and cross the thread to extend in an axial direction of the screw) are twisted on the longitudinal axis of the screw, initial drive torque of the screw is reduced to facilitate its tapping operation.

According to the third aspect of the present invention as to the screw, the screw is provided with the special non-circular taper thread portion 2c in its front-end converging portion. Due to the provision of such taper thread portion 2c, it is possible for the screw of the present invention to be easily screwed into the hole of the article even when the hole is reduced in diameter or clogged with paints and like substances.

According to the fourth aspect of the present invention as to the screw, since the special non-circular taper thread portion 2c is provided in the converging front end of the screw, the screw of the present invention is easily screwed into the hole of the article being fastened.

Further, according to the fifth aspect of the present invention as to the method for producing the screw, since the screw of the present invention is produced by rolling of the blank 5 constructed of a stepped-diameter stock, it is possible to precisely form at once both the crest portion's highest points of the special non-circular thread portion 2b and the crest portions of the circular thread portion 2a with the same height or depth. This is also true in the root portions of both the portions 2b and 2a, which makes the screw of the present invention a precision one.

According to the sixth aspect of the present invention as to the method for producing the screw, since the converging transition portion 9 is formed between the large-diameter portion 8 and the small-diameter portion 10 in a manner such that the latter portion 10 is smaller in cross-sectional area than the former portion 8 by the amount of from 1.0 to 8.0 per cent of a cross-sectional area of the former portion 8, it is possible for the thread of the screw of the present invention to smoothly transfer from the special non-circular thread portion 2b to the circular thread portion 2a of the screw, which enables the screw of the present invention to be easily screwed into the hole of the article being fastened.

Further, according to the seventh aspect of the present invention as to the method for producing the screw, since the blank 5 of the screw of the present invention is provided with the taper portion 11 in its front-end portion and the flat thread rolling die 12 is provided with the special non-circular taper thread rolling portion 14c in its lower-end portion, it is possible to completely form the special non-circular taper thread portion 2c throughout the front-end portion of the blank 5. Consequently, even when the hole of the article to be fastened is reduced in diameter or clogged with paints and like substances, it is possible for the screw of the present invention to be easily screwed into such hole.

As is clear from the above description of the present invention, the screw of the present invention may be used even in a field in which the conventional screw can not be used. In other words, the screw of the present invention is widely used in various fields, and, therefore considerably advantageous in industrial fields.

What is claimed is:

1. A method for producing a screw from a stepped-stock blank, said stepped-stock blank including a first portion for forming a circular threaded portion of said screw and a second portion for forming a special non-circular threaded portion of said screw, said second portion being smaller in cross section then said first portion, the method comprising the steps of:

rolling the first portion of said stepped-stock blank with a flat thread rolling die which includes a plurality of first rolling grooves having a predetermined depth to form the circular threaded portion of said screw; and rolling the second portion of said stepped-stock blank with the flat thread rolling die which includes a plurality of second rolling grooves gradually varying in depth to form the special non-circular threaded portion of said screw;

wherein said second rolling grooves have a plurality of deepest points being equal to the predetermined depth of said first rolling grooves;

wherein crest portions of both said first and second rolling grooves have the same height and lie in the same plane;

wherein a line passing through vertically adjacent deepest points of said second rolling grooves forms an inclination angle with respect to a line which is vertical in relation to said die; and wherein said second rolling grooves follow said first rolling grooves, both said first and second rolling grooves extending parallel to each other at a predetermined lead angle to cover the entire surface of said die.

2. The method for producing a screw as set forth in claim 1, further comprising the step of:

forming a transition portion in said stepped-stock blank for smoothly connecting said second portion to said first portion of said stepped-stock blank;

wherein said second portion of said stepped-stock blank of said screw is smaller in cross section than said first portion of said stepped-stock blank of said screw by between 1.0 to 8.0 per cent of a cross sectional area of said first portion.

3. The method for producing a screw as set forth in claim 2, further comprising the steps of:

forming said stepped-stock blank of said screw such that a front-end portion is converged into a front-end taper portion which decreases in diameter toward its front end; and rolling said stepped-stock blank of said screw with a thread rolling die to provide an inclination portion which has its crest portions of thread gradually increasing in thread height or depth so as to correspond to said front-end taper portion of said stepped-stock blank being rolled.

4. The method for producing a screw, as set forth in claim 1, further comprising the steps of:

forming said stepped-stock blank of said screw such that a front-end portion is converged into a front-end taper portion which decreases in diameter toward its front end; and rolling said stepped-stock blank of said screw with a thread rolling die to provide an inclination portion which has its thread crest portions gradually increasing in thread height or depth so as to correspond to said front-end taper portion of said stepped-stock blank being rolled.

5. The method for producing a screw as set forth in claim 1, wherein said inclination angle of said line passing through said deepest points is between 10 and 15 degrees.

6. A method for producing a screw from a stepped-stock blank, said stepped-stock blank including a first portion for forming a circular threaded portion of said screw and a second portion for forming a special non-circular threaded portion of said screw, said second portion being smaller in cross section then said first portion, the method comprising the steps of:

rolling the first portion of said stepped-stock blank with a flat thread rolling die which includes a plurality of first rolling grooves having a predetermined depth to form the circular threaded portion of said screw; and rolling the second portion of said stepped-stock blank with the flat thread rolling die which includes a plurality of second rolling grooves gradually varying in depth to form the special non-circular threaded portion of said screw;

wherein crest portions of both said first and second rolling grooves have the same height and lie in the same plane; and wherein said second rolling grooves follow said first rolling grooves, both said first and second rolling grooves extending parallel to each other at a predetermined lead angle to cover the entire surface of said die.

7. A method for producing a screw from a stepped-stock blank, said stepped-stock blank including a first portion for forming a circular threaded portion of said screw and a second portion for forming a special non-circular threaded portion of said screw, said second portion being smaller in cross section then said first portion, the method comprising the steps of:

rolling the first portion of said stepped-stock blank with a flat thread rolling die which includes a plurality of first rolling grooves having a predetermined depth to form the circular threaded portion of said screw; and rolling the second portion of said stepped-stock blank with the flat thread rolling die which includes a plurality of second rolling grooves gradually varying in depth to form the special non-circular threaded portion of said screw;

wherein said second rolling grooves have a plurality of deepest points being equal to the predetermined depth of said first rolling grooves; and wherein said second rolling grooves follow said first rolling grooves, both said first and second rolling grooves extending parallel to each other at a predetermined lead angle to cover the entire surface of said die.

8. The method for producing a screw as set forth in claim 7, wherein a line passing through vertically adjacent deepest points of said second rolling grooves forms an inclination angle with respect to a line which is vertical in relation to said die.

* * * * *

UNITED STATES PATENT AND TRADEMARK OFFICE
CERTIFICATE OF CORRECTION

PATENT NO. : 5,842,923
DATED : December 1, 1998
INVENTOR(S) : UMEMURA et al.

It is certified that error appears in the above-identified patent and that said Letters Patent is hereby corrected as shown below:

On the Title page, Item [22], under the heading "Filed:", change "Nov. 28, 1997" to --Nov. 25, 1997--.

Signed and Sealed this

Fourteenth Day of March, 2000

Attest:

Q. TODD DICKINSON

*Attesting Officer*      *Commissioner of Patents and Trademarks*